(12) United States Patent
Lee et al.

(10) Patent No.: US 6,502,801 B2
(45) Date of Patent: Jan. 7, 2003

(54) APPARATUS AND METHOD FOR MOLDING A CORE FOR USE IN CASTING HOLLOW PARTS

(75) Inventors: Martin Kin-Fei Lee, Niskayuna, NY (US); George Gerald Gunn, Landrum, SC (US); James Michael Placko, West Chester, OH (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 09/866,430

(22) Filed: May 29, 2001

(65) Prior Publication Data

US 2001/0024000 A1 Sep. 27, 2001

Related U.S. Application Data

(62) Division of application No. 09/441,325, filed on Nov. 16, 1999, now Pat. No. 6,331,267.

(51) Int. Cl.[7] .................................................. B28B 7/20
(52) U.S. Cl. ........................... 249/79; 249/80; 249/111; 249/134; 249/154; 249/160
(58) Field of Search ................................ 249/134, 154, 249/160, 79, 80, 111

(56) References Cited

U.S. PATENT DOCUMENTS 4,813,470 A * 3/1989 Chiang ........................ 164/125
6,156,250 A * 12/2000 Torres et al. ................ 264/219
6,331,267 B1 * 12/2001 Lee et al. ..................... 264/401

FOREIGN PATENT DOCUMENTS

JP 59-169647 * 9/1984

OTHER PUBLICATIONS

Derwent Acc No. 1984–273804, Sep. 1984.*

* cited by examiner

*Primary Examiner*—James Derrington
(74) *Attorney, Agent, or Firm*—Patrick K. Patnode; Christian G. Cabou

(57) ABSTRACT

A mold for molding a core for use in casting hollow parts includes, a lower mold portion and an upper mold portion defining therein a cavity corresponding to the outer surface of the core. The lower mold portion includes a cutout disposed along a parting line defined between the lower mold portion and the upper mold portion and opening onto the cavity. After introduction of a ceramic slurry mixture into the mold the upper mold portion is removable, to expose a first side of the core and a protective flash formed in the cutout. Desirably, a heat shield is positioned over the protective flash and the exposed portion of the parting line of the lower mold portion so that the lower mold portion is not exposed directly to a flame during a preliminary firing to impart sufficient strength to the ceramic core so that the ceramic core may be handled. Providing the core with a protective flash allows the mold to be advantageously fabricated by rapid tooling technique such as by a stereolithography process from a plastic material.

12 Claims, 4 Drawing Sheets

APPARATUS AND METHOD FOR MOLDING A CORE FOR USE IN CASTING HOLLOW PARTS

This application is a division of application Ser. No. 09/441,325, filed Nov. 16, 1999, now U.S. Pat. No. 6,331,267, which is hereby incorporated by reference in its entirety.

BACKGROUND OF THE INVENTION

This invention relates generally to molds, and more particularly, to an apparatus and method for molding cores for use in casting hollow parts.

Turbine systems often include a plurality of airfoils, e.g., vanes, nozzles, blades, buckets, which are hollow to provide a cooling passage. An airfoil is typically formed by an investment casting process using a ceramic core. The ceramic core is then leached out leaving a hollow passage in the airfoil.

The ceramic cores themselves are typically molded using metal molds or dies. To remove the ceramic core from the mold without damage, often a preliminary firing is required to impart sufficient strength to the core so that the core may be handled. For example, one portion or half of the mold is removed to expose an outer surface portion of the core. This exposed outer surface portion is then heated, for example, with a torch. Thereafter, the core is removed, placed in an oven, and heated.

A drawback with using metal molds to mold the ceramic cores is that the metal molds are time consuming and expensive to produce. In addition, with a new hollow part, the time and cost to develop the part increases where many design iterations of the part are involved and each design iteration requires fabrication of a new mold for molding the core.

Stereolithography is a rapid prototyping and tooling process that has become widely popular for use in rapidly producing three-dimensional solid objects directly from electronic models. For example, stereolithography has been used to produce molds for molding plastic parts. The process involves developing a solid model from a liquid photopolymer epoxy resin by exposing it to an ultraviolet laser. The resin solidifies in layers about 0.003 inch to about 0.010 inch thick with each pass of the laser.

The use of plastic tooling or molds produced by stereolithography for making ceramic cores is limited due to the requirement of a preliminary firing or torching to impart sufficient strength to the ceramic core so that the ceramic core may be handled. For example, localized temperatures experienced by the mold can be close to about 2,000 degrees Fahrenheit during this preliminary firing or torching, whereas the plastic molding is operable up to temperatures of about 400 degrees Fahrenheit. In particular, the extreme temperatures of the preliminary firing or torching results in unacceptable degradation and distortion of the plastic molds. Accordingly, there is a need in the art for an improved apparatus and method for molding a ceramic core.

SUMMARY OF THE INVENTION

An apparatus for molding a core for use in casting a hollow part in which the apparatus includes a mold having a first mold portion and a second mold portion defining a cavity for molding the core. The first mold portion includes a cutout disposed along a parting line defined between the first mold portion and the second mold portion and opening onto the cavity. Alternatively, the first mold portion includes means for molding a protective flash attached to the core and disposed along the parting line.

The first and second mold portions typically comprise a plastic material and are formed by stereolithography. The apparatus typically includes a heat shield disposable over the protective flash and parting line for preventing deterioration to the mold during a preliminary firing to strengthen the core so that the core may be handled. Advantageously, the first mold portion may include cooling tubes for enabling removal of heat from the mold during the preliminary firing.

In another aspect of the present invention, a method for molding a core from a moldable material for use in casting hollow parts includes, providing a mold as described above, providing a moldable material, introducing the moldable material into the cavity of the mold, removing the second mold portion, and heating an exposed surface of the moldable material. The method typically includes providing a heat shield and positioning the heat shield over a protective flash molded by the cutout and a parting line of the first mold portion. The method may also include providing a support, placing the core in the support, and heating the support and the core in an oven.

DETAILED DESCRIPTION OF THE INVENTION

Figure 1:
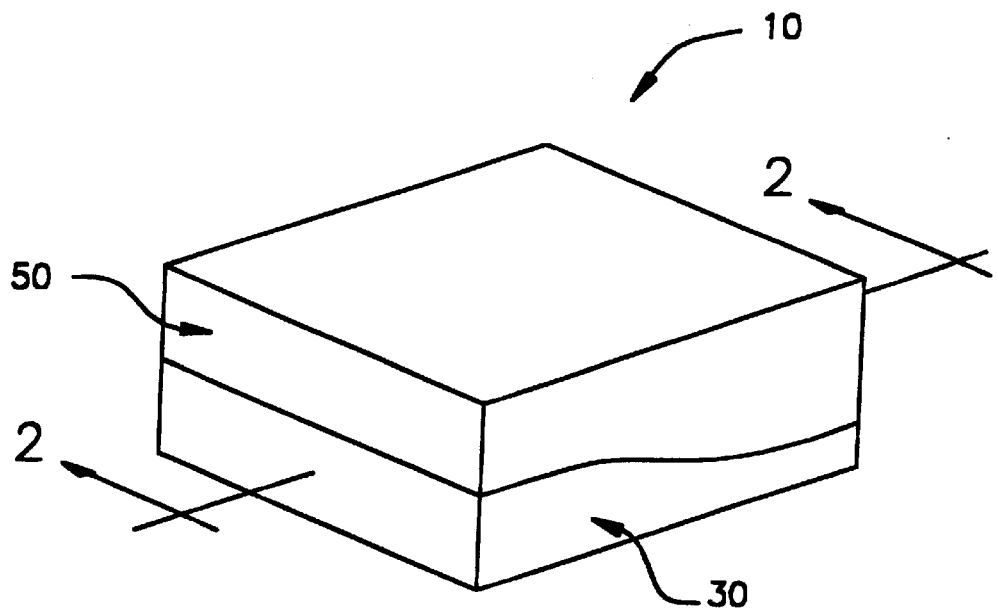
FIG. 1 is a perspective view of a mold of the present invention for molding a core for use in casting hollow parts.

FIG. 1 illustrates an exemplary die or mold 10 of the present invention for molding a core 12 (FIG. 5) for use in casting hollow parts (not shown). Advantageously, mold 10 is suitable for forming ceramic cores which are used in molding hollow turbine airfoils. Desirably, mold 10 is readily fabricated by rapid tooling techniques, as described below, to quickly and inexpensively produce molds for molding cores for casting hollow parts.

Figure 2:
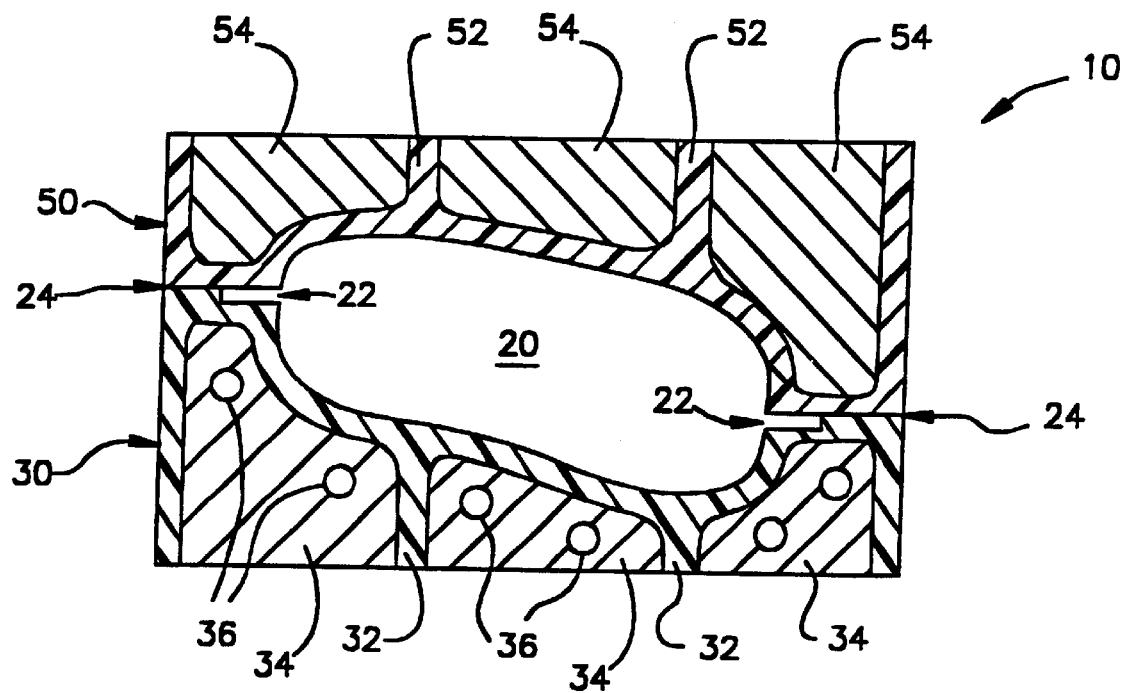
FIG. 2 is an enlarged, cross-sectional view taken along line 2—2 of FIG. 1.

As shown in FIG. 2, exemplary mold 10 includes a first mold half or lower mold portion 30 and a second mold half or upper mold portion 50 defining therein a cavity 20 which corresponds to the outer surface of a core to be formed.

Figure 3:
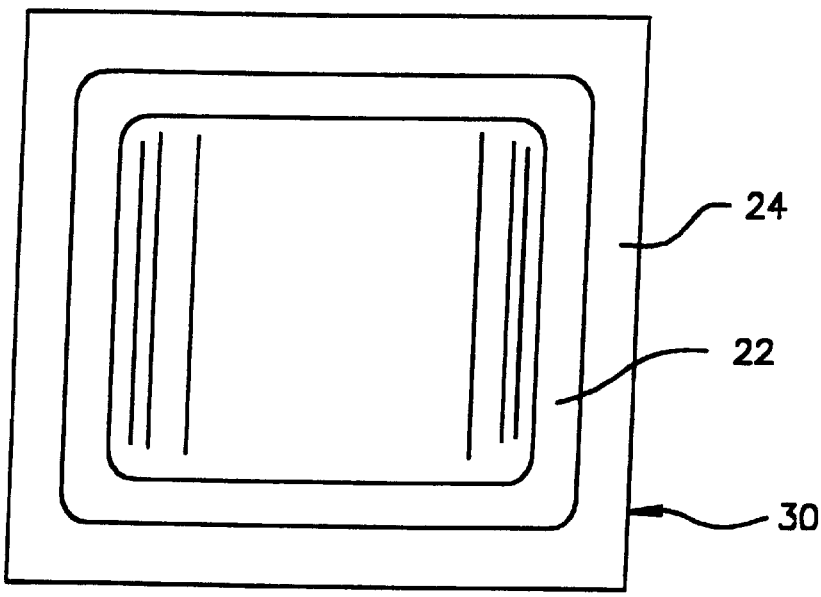
FIG. 3 is an enlarged, plan view of the lower mold portion shown in FIG. 1.
Figure 5:
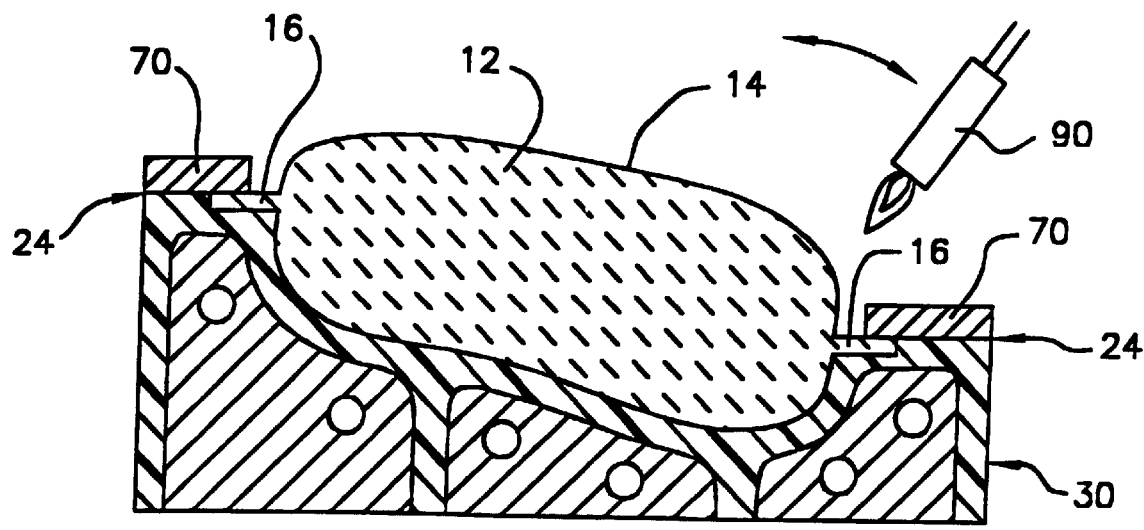
FIG. 5 is an enlarged, cross-sectional view taken along line 2—2 of FIG. 1 with the upper portion removed, and a heat shield positioned around the core for protecting the lower mold during a preliminary firing or torching of an upper surface of the core.

Lower mold portion 30 further includes a cutout 22 which is disposed along a parting line 24 defined between lower mold portion 30 and upper mold portion 50 and opening onto cavity 20. As best shown in FIG. 3, desirably cutout 22 extends completely around parting line 24 defined by first mold portion 30. As described below, cutout 22 forms a protective flash 16 (FIG. 5) during the molding of core 12 (FIG. 5). Protective flash 16 includes a suitable width and depth extending from core 12 to protect lower mold portion 30 during a preliminary firng or torching. For example, the thickness of the protective flash for relatively small cores is about 0.04 inch and for relatively large cores about 0.10 inch. The length of the protective flash may be in range of about 0.12 inch to about 0.5 inch.

Mold 10 is advantageously fabricated by a stereolithography process from a plastic material such as a liquid photopolymer epoxy resin by exposing it to an ultraviolet laser. For example, electronic models of a part, e.g., a hollow turbine airfoil, can be readily used to design mold 10 having a cavity for forming a core.

Desirably, the lower and upper mold portions 30 and 50 are generally shells with an interior geometry forming cavity 20. The back or rear portion of each of lower and upper mold portions 30 and 50 are desirably hollow to reduce the material and time required for forming the lower and upper mold portions 30 and 50, respectively, by the stereolithography process. Advantageously, the hollow rear portions of lower and upper mold portions 30 and 50 include ribs 32 and 52, respectively, for added strength. To further strengthen lower and upper mold portions 30 and 50, the hollow rear portions between the ribs are desirably filled with a metal filled epoxy 34 and 54, respectively. In addition, the metal filled epoxy creates a heat sink during the preliminary firing. To further remove heat during the preliminary firing of core 12 (FIG. 5), desirably lower mold 30 includes metal tubing 36 (FIG. 2) embedded in the metal epoxy. A cooling fluid may be passed through the metal tubing to reduce the rate of heating of the lower mold portion during the preliminary firing of the ceramic core. In addition, the first mold portion may include ejector pins for ejecting the core from the mold after the preliminary firing.

Figure 4:
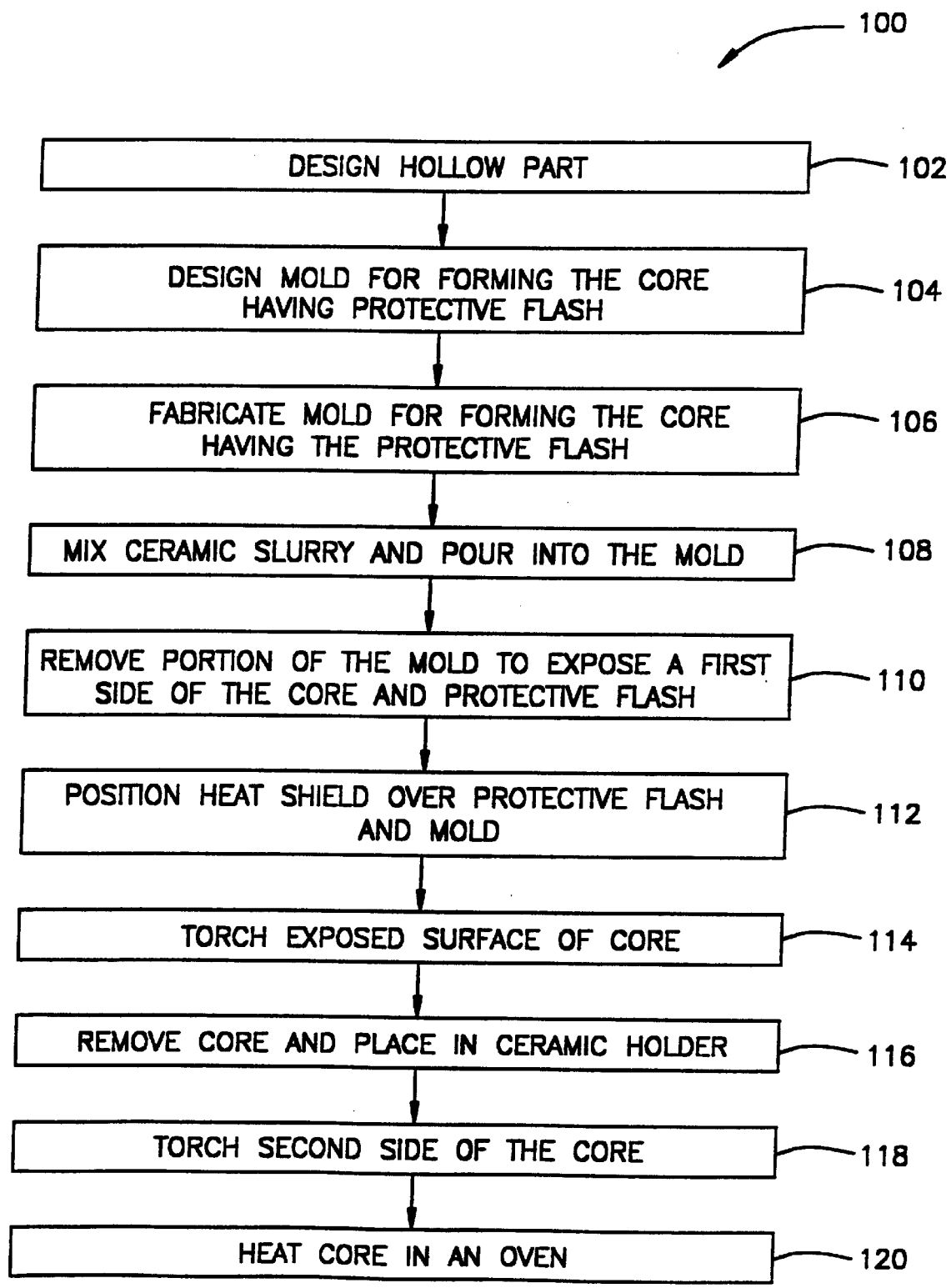
FIG. 4 is a flowchart describing the process for molding a core using the mold shown in FIG. 1.

FIG. 4 is a flowchart illustrating a process 100 for molding core 12 (FIG. 5) for use in casting a hollow part. Initially, the part is designed at 102, and using the electronic model of the hollow part, mold 10 (FIG. 2) is designed for forming core 12 (FIG. 5) having a protective flash 16 (FIG. 5) at 104. Mold 10 (FIG. 2) is fabricated desirably using rapid tooling techniques such as stereolithography at 106, and provided with means for removing heat, e.g., cooling tubing as described above.

Lower and upper mold portions 30 and 50 of mold 10 (FIG. 2) are then secured together by clamps, bolts, or placed in a metal holding fixture having pockets sized for receiving mold 10 therein. At 108, a ceramic slurry mixture or curable material is then introduced or poured into cavity 20 (FIG. 2) of mold 10 (FIG. 2). Desirably, pressure is applied to the ceramic slurry mixture in the cavity by a plunger.

At 110, and as shown in FIG. 5, upper mold portion 50 is removed to expose a first side or surface 14 of core 12 and protective flash 16. At 112 of FIG. 4 and as depicted in FIG. 5, a heat shield 70 is positioned over and in contact with protective flash 16 and the exposed portion of parting line 24 of lower mold portion 30. Heat shield 70 desirably overlaps protective flash 16 and parting line 24 of lower mold portion 30 so that lower mold portion 30 will not be exposed directly to the flame of a torch 90 during the preliminary firing of core 12. Heat shield 70 may include a metallic material such as steel or aluminum of sufficient thickness to provide heat absorption capacity during torching. The underside of the metal heat shield can be machined to conform to the mold and the protective flash of the ceramic core. Alternatively, heat shield 70 may include a heat/flame resistant fabric such as Zetex Plus Fabric manufactured by Newtex Industries, Inc. of Victor, New York or heat resistant moldable or machinable ceramic material such as provided by Zincar Products, Inc. of Florida, New York.

Figure 6:
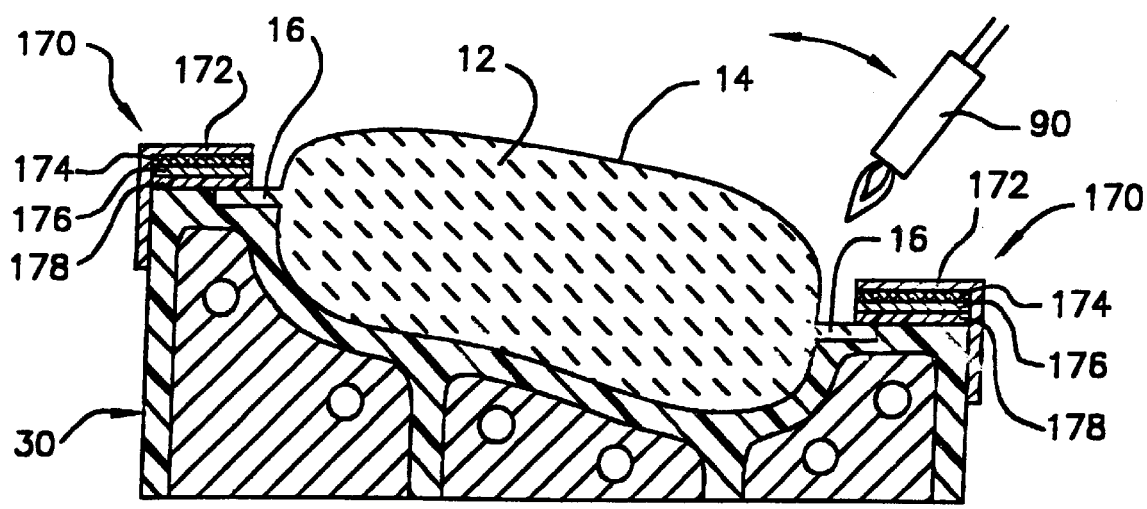
FIG. 6 is a cross-sectional view, similar to FIG. 5, illustrating an alternative embodiment of a heat shield.

FIG. 6 illustrates an alternative heat shield 170 which includes a top heat reflecting material 172 such as a sheet of aluminum, a heat/flame resistant fabric 174, a layer of heat insulating material 176 such as fiber glass wool, and a moldable heat resistant material 178. The glass wool, provides insulation as well as some compliance, and the heat resistant fabric provides protection against the direct flame. The top heat reflective layer may be single or multiple sheets of aluminum to provide heat reflection. Desirably, the aluminum sheet wraps around the edges of the heat shield assembly and the edge of the lower mold portion.

Where the surface profile of the parting line of the lower mold portion is complicated, the moldable heat resistant material may be made of high temperature silicone rubber molded to fit the profile or the parting line. Alternatively, a heat resistant epoxy material may be formed by a stereolithography process to match the profile of the parting line.

At 114, a preliminary firing, for example, using torch 90 (FIGS. 5 and 6) heats the exposed surface of the core to impart sufficient strength to the core so that the core may be handled. Optional embedded or hand-held temperature sensors can be used to monitor the surface temperature of the exposed surface of the core or the lower mold portion to control the preliminary firing process so that the mold portion temperature is within allowable limits.

Figure 7:
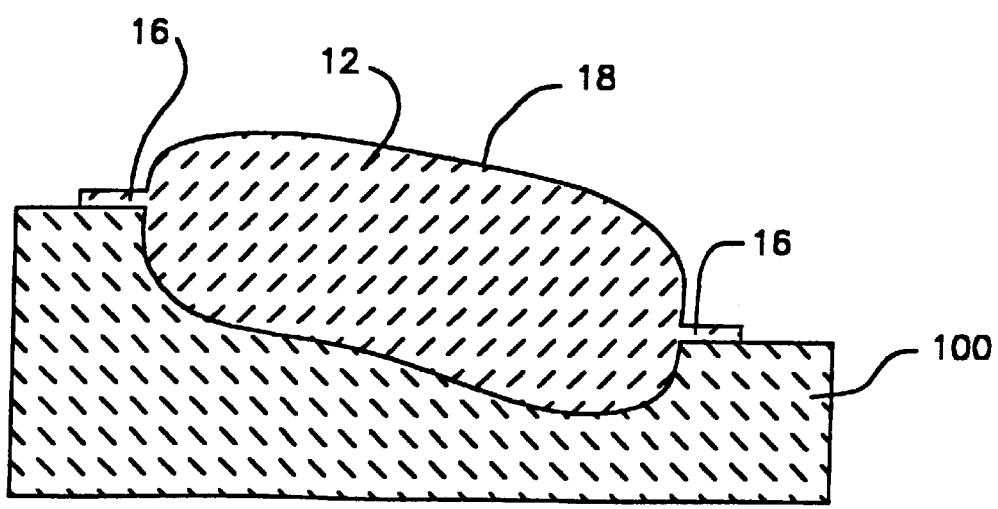
FIG. 7 is a cross-sectional view of a support for supporting the core, shown in FIGS. 5 and 6, during a preliminary firing of the lower surface of the core and heating of the core in an oven.

At 116, core 12 is removed and placed in a ceramic holder or support 100 as shown in FIG. 7 (or alternatively in upper mold portion 50 along with a suitable heat shield), and heat is applied with torch 90 to a lower exposed side or surface 18 of core 12, at 118.

Core 12 and the ceramic support 100 are then placed in an oven for firing, at 120, so that the core is sufficiently strong for use in casting a hollow part. From the present description, it will be appreciated that the preliminary firing of the second side may not be necessary. The protective flash 16 is removed before or after placing the core in support 100 and prior to casting the hollow part. Steps 108 through 120 can be repeated for fabricating additional cores 12 (FIG. 5) from mold 10 (FIG. 2).

Advantageously, by protecting the plastic mold during the preliminary firing process, the present invention enables the use of rapid tooling techniques for forming plastic molds for molding a plurality of ceramic cores for casting hollow parts.

From the present description, it will be appreciated by those skilled in the art that the mold portions may alternatively be fabricated from a solid block of plastic, for example, by computer numerical control machining.

Thus, while various embodiments of the present invention have been illustrated and described, it will be appreciated to those skilled in the art that many changes and modifications may be made thereunto without departing from the spirit and scope of the invention.

What is claimed is:

1. An apparatus for molding a core for use in casting a hollow part, the apparatus comprising:

a mold having a first mold portion and a second mold portion defining a cavity for molding the core;

said first mold portion comprising a cutout disposed along a parting line defined between said first mold portion and said second mold portion and opening onto said cavity wherein the molds are separated and;

a heat shield is positioned over and in contact with said parting line and a protective flash molded in the cutout of the first mold portion.

2. The apparatus of claim 1 wherein said first mold portion and said second mold portion comprise heat resistant material.

3. The apparatus of claim 2 wherein said first mold portion and said second mold portion are formed by stereolithography.

4. The apparatus of claim 1 wherein said cutout extends substantially around the core.

5. The apparatus of claim 1 wherein said heat shield comprises a material selected from the group consisting of metal, fiber glass, heat resistant fabric, ceramic, and heat resistant silcone.

6. The apparatus of claim 1 wherein said first mold portion comprises means for enabling removal of heat.

7. An apparatus for molding a core for use in casting a hollow part, the apparatus comprising:

a mold having a first mold portion and a second mold portion defining a cavity for molding the core; and said first mold portion comprising means for molding a protective flash attached to the core and disposed along a parting line defined between said first mold portion and opening onto said cavity wherein the molds are separated and;

a heat shield is positioned over and in contact with said parting line and a protective flash molded in the cutout of the first mold portion.

8. The apparatus of claim 7 wherein said first mold portion and said second mold portion comprise a heat resistant material.

9. The apparatus of claim 8 wherein said first mold portion and said second mold portion are formed by stereolithography.

10. The apparatus of claim 7 wherein said means for molding the protective flash comprises means for molding the protective flash disposed substantially entirely around the core.

11. The apparatus of claim 7 wherein said heat shield comprises a material selected form the group consisting of metal, fiber glass, heat resistant fabric, ceramic, and heat resistant silicone.

12. The apparatus of claim 7 wherein said first mold portion comprises means for enabling removal of heat.

* * * * *